(12) United States Patent
Ickert (10) Patent No.: US 11,718,432 B2
(45) Date of Patent: Aug. 8, 2023

(54) SEALING CARDBOARD BLANKS BY PLACEMENT ONTO CONVEYOR BELT

(71) Applicant: Multivac Sepp Haggenmüller SE & Co. KG, Wolfertschwenden (DE)

(72) Inventor: Lars Ickert, Kempten (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 507 days.

(21) Appl. No.: 16/723,577

(22) Filed: Dec. 20, 2019

(65) Prior Publication Data

US 2020/0198817 A1    Jun. 25, 2020

(30) Foreign Application Priority Data

Dec. 21, 2018   (DE) ..................... 10 2018 222 836.1

(51) Int. Cl.
*B65B 31/02*    (2006.01)
*B65B 7/16*    (2006.01)
(Continued)

(52) U.S. Cl.
CPC ............ *B65B 31/028* (2013.01); *B65B 7/164* (2013.01); *B65B 11/52* (2013.01); *B29C 66/112* (2013.01);
(Continued)

(58) Field of Classification Search
CPC ............ B29C 66/112; B29C 66/53461; B29C 66/849; B29L 2031/712; B65B 7/164;
(Continued)

(56) References Cited

U.S. PATENT DOCUMENTS 2,439,773 A * 4/1948 Hohl ..................... B67C 3/10
  141/70
2,695,483 A * 11/1954 Toews ................... B65B 9/02
  53/58

(Continued)

FOREIGN PATENT DOCUMENTS

DE     1800741 A1    5/1969
DE    34 04 451 A1    8/1985
(Continued)

OTHER PUBLICATIONS

European Search Report dated Apr. 15, 2020, Application No. 19205055.7-1016, Applicant MULTIVAC Sepp Haggenmueller SE & Co. KG, 7 Pages.

*Primary Examiner* — Robert F Long
*Assistant Examiner* — Eduardo R Ferrero
(74) *Attorney, Agent, or Firm* — Brooks Kushman P.C.

(57) ABSTRACT

The invention relates to a packaging machine and a method for the production of individual packagings. Each package may include a planar product carrier and a top film which encloses a product disposed on the product carrier in a gas-tight manner. The packaging machine may include a sealing station with a tool upper part having an outer frame and at least one sealing tool movably mounted for a sealing operation, and a tool lower part that comprises a belt conveying module with at least one conveyor belt mounted thereon. The tool upper part and the tool lower part are moved toward each other to form a sealing chamber in a closed position of the sealing station. In the closed position, the sealing tool may be lowered within the sealing chamber from a resting position to a sealing position to seal the package.

23 Claims, 7 Drawing Sheets

(51) Int. Cl.
    *B65B 11/52*         (2006.01)
    *B29C 65/00*         (2006.01)
    *B29L 31/00*         (2006.01)
    *B65B 9/04*          (2006.01)
    *B65B 41/14*         (2006.01)

(52) U.S. Cl.
    CPC ...... *B29C 66/53461* (2013.01); *B29C 66/849* (2013.01); *B29L 2031/712* (2013.01); *B65B 9/04* (2013.01); *B65B 41/14* (2013.01)

(58) Field of Classification Search
    CPC ........... B65B 7/28; B65B 9/04; B65B 31/028; B65B 41/14; B65B 41/04; B65B 41/046; B65B 41/043; B65B 61/06; B65B 11/52
    USPC .................................. 53/427, 509, 433, 511
    See application file for complete search history.

(56) References Cited

U.S. PATENT DOCUMENTS

| | | | | |
|---|---|---|---|---|
| 2,927,409 | A * | 3/1960 | Heyer | B65B 9/04 53/427 |
| 3,090,174 | A * | 5/1963 | Kraft | B29C 65/18 53/433 |
| 3,117,873 | A * | 1/1964 | Bartels | B65D 7/42 53/436 |
| 3,204,384 | A * | 9/1965 | Dallas, Jr. | B65B 11/52 53/427 |
| 3,371,464 | A * | 3/1968 | Josephs | B65B 11/52 53/509 |
| 3,399,509 | A * | 9/1968 | Greco | B65B 11/52 53/374.4 |
| 3,491,504 | A * | 1/1970 | Pasco | B65B 11/52 53/427 |
| 3,634,993 | A * | 1/1972 | Pasco | B65B 11/52 53/433 |
| 3,701,229 | A * | 10/1972 | Zelnick | B65B 11/52 53/427 |
| 3,832,821 | A * | 9/1974 | Walus | B65B 11/52 53/427 |
| 3,835,618 | A * | 9/1974 | Perdue | B65B 31/02 53/509 |
| 3,895,475 | A * | 7/1975 | Wolfelsperger | B65B 31/021 53/427 |
| 3,942,298 | A * | 3/1976 | Matzinger | B65B 51/14 53/409 |
| 3,966,045 | A * | 6/1976 | Perdue | B65B 61/18 206/443 |
| 4,077,184 | A * | 3/1978 | Kremer, Jr. | B65B 11/52 53/427 |
| 4,085,565 | A * | 4/1978 | Mahaffy | B65B 31/021 53/511 |
| 4,145,863 | A * | 3/1979 | Hannon | B65B 11/52 53/509 |
| 4,162,599 | A * | 7/1979 | Kyle | B65B 31/043 53/511 |
| 4,164,109 | A * | 8/1979 | Dubois | B65B 11/52 53/427 |
| 4,188,770 | A * | 2/1980 | Tabur | B65B 11/52 53/509 |
| 4,262,050 | A * | 4/1981 | Jenkins | B32B 3/28 428/138 |
| 4,685,274 | A * | 8/1987 | Garwood | B65B 31/021 426/129 |
| 4,791,775 | A * | 12/1988 | Raque | B65B 31/043 53/110 |
| 4,819,412 | A * | 4/1989 | Sengewald | B65B 9/04 53/282 |
| 5,054,265 | A * | 10/1991 | Perigo | B21D 51/32 53/425 |
| 5,071,667 | A * | 12/1991 | Grune | B65B 31/00 426/316 |
| 5,155,974 | A * | 10/1992 | Garwood | B65B 7/168 426/129 |
| 5,247,746 | A * | 9/1993 | Johnson | B65B 31/043 53/109 |
| 5,443,150 | A * | 8/1995 | Buchko | B65B 31/021 198/463.6 |
| 5,514,392 | A * | 5/1996 | Garwood | B65D 25/102 206/213.1 |
| 5,534,282 | A * | 7/1996 | Garwood | B65B 31/028 426/396 |
| 5,564,225 | A * | 10/1996 | Quiding | B65D 85/505 47/84 |
| 5,617,705 | A * | 4/1997 | Sanfilippo | B65B 31/028 53/489 |
| 5,697,203 | A * | 12/1997 | Niwa | B65B 31/08 99/477 |
| 5,816,024 | A * | 10/1998 | Sanfilippo | B65B 31/00 53/510 |
| 6,044,622 | A * | 4/2000 | Brady | B65B 25/067 426/129 |
| 6,050,065 | A * | 4/2000 | Bonde | B29C 66/849 53/550 |
| 6,202,388 | B1 * | 3/2001 | Sanfilippo | B65B 31/028 53/432 |
| 6,282,866 | B1 * | 9/2001 | Natterer | B65B 7/164 198/833 |
| 6,698,165 | B1 * | 3/2004 | Natterer | B65B 7/164 426/392 |
| 6,834,476 | B2 * | 12/2004 | Konishi | B65B 7/164 53/329.4 |
| 6,843,043 | B2 * | 1/2005 | Hanson | B65B 55/14 53/512 |
| 7,464,521 | B2 * | 12/2008 | Koke | B65B 31/021 53/510 |
| 7,487,625 | B2 * | 2/2009 | Natterer | B65B 9/04 53/433 |
| 7,600,358 | B2 * | 10/2009 | Natterer | B65B 7/164 53/432 |
| 8,689,529 | B2 * | 4/2014 | Rearick | B65B 25/04 53/433 |
| 9,162,825 | B2 * | 10/2015 | Vaccari | B65G 25/02 |
| 10,858,130 | B2 * | 12/2020 | Cosaro | B65B 9/06 |
| 2001/0011445 | A1 * | 8/2001 | Scolaro | B65B 31/021 53/433 |
| 2001/0017021 | A1 * | 8/2001 | Sanfilippo | B65B 31/028 53/432 |
| 2003/0131568 | A1 * | 7/2003 | Rossi | B29C 65/18 53/510 |
| 2006/0255201 | A1 * | 11/2006 | Natterer | B65B 7/164 242/522 |
| 2007/0022717 | A1 * | 2/2007 | Seggern | B29C 66/61 53/433 |
| 2007/0130882 | A1 * | 6/2007 | Conti | B65B 47/04 53/122 |
| 2008/0120944 | A1 * | 5/2008 | Rimondi | B65B 31/043 53/285 |
| 2008/0245031 | A1 * | 10/2008 | Salvoni | B65G 47/31 198/460.3 |
| 2009/0288365 | A1 * | 11/2009 | Negele | B65B 31/028 53/329 |
| 2009/0313956 | A1 * | 12/2009 | Martinez Sampedro | B29C 51/46 53/559 |
| 2010/0293899 | A1 * | 11/2010 | Boekstegers | B65D 81/2076 53/507 |
| 2011/0083401 | A1 * | 4/2011 | Scheibel | B65B 9/04 53/420 |
| 2012/0023865 | A1 * | 2/2012 | Ehrmann | B65B 65/02 53/167 |
| 2012/0159906 | A1 * | 6/2012 | Ickert | B65B 7/164 53/485 |
| 2012/0204516 | A1 * | 8/2012 | Palumbo | B65B 41/06 53/403 |
| 2012/0272623 | A1 * | 11/2012 | Osterrieder | B65B 7/164 53/485 |

(56) References Cited

U.S. PATENT DOCUMENTS

| | | | |
|---|---|---|---|
| 2012/0324835 A1* | 12/2012 | Ickert | B29C 66/92921 53/476 |
| 2013/0055688 A1* | 3/2013 | Jokele | B65B 57/00 53/476 |
| 2013/0133286 A1* | 5/2013 | Taghipour | B65B 59/04 53/202 |
| 2013/0152512 A1* | 6/2013 | Sdahl | B65B 61/20 53/461 |
| 2013/0255201 A1* | 10/2013 | Holzem | B65B 7/164 53/557 |
| 2014/0033647 A1* | 2/2014 | Izquierdo Ereno | B65B 51/10 53/218 |
| 2014/0123599 A1* | 5/2014 | Gustafsson | B65B 31/021 53/405 |
| 2015/0041043 A1* | 2/2015 | Austermeier | B65C 1/02 156/60 |
| 2016/0068288 A1* | 3/2016 | Palumbo | B29C 66/919 53/511 |
| 2016/0176598 A1* | 6/2016 | Palumbo | B65B 11/52 206/497 |
| 2016/0194101 A1* | 7/2016 | Palumbo | B65B 65/003 53/433 |
| 2017/0029146 A1* | 2/2017 | Palumbo | B65B 41/12 |
| 2017/0267463 A1* | 9/2017 | Ickert | B65G 47/30 |
| 2017/0305585 A1* | 10/2017 | Rizzi | B29C 65/7847 |
| 2018/0072443 A1* | 3/2018 | Cosaro | B65B 9/06 |
| 2018/0118381 A1* | 5/2018 | Ehrmann | B65B 35/24 |
| 2018/0155074 A1* | 6/2018 | Gabler | B65B 31/028 |
| 2018/0312287 A1* | 11/2018 | Frank | B65C 9/46 |
| 2018/0346167 A1 | 12/2018 | Capriotti et al. | |
| 2019/0185188 A1* | 6/2019 | Palumbo | B65B 61/02 |
| 2020/0391920 A1* | 12/2020 | Di Fiore | B65B 11/52 |

FOREIGN PATENT DOCUMENTS

| | | | |
|---|---|---|---|
| DE | 102012001817 A1 | 8/2013 | |
| DE | 102012020359 A1 | 4/2014 | |
| EP | 1932765 A2 * | 6/2008 | B65B 31/043 |
| EP | 3028837 A1 | 6/2016 | |
| EP | 34 09 600 A1 | 12/2018 | |
| WO | 2004/022431 A1 | 3/2004 | |
| WO | 2018024382 A1 | 2/2018 | |

* cited by examiner

SEALING CARDBOARD BLANKS BY PLACEMENT ONTO CONVEYOR BELT

CROSS-REFERENCE TO RELATED APPLICATIONS

This Application claims priority to German Patent Application No. 10 2018 222 836.1 filed on Dec. 21, 2018 to Lars Ickert, currently pending, the entire disclosure of which is incorporated herein by reference.

FIELD OF THE INVENTION

The present invention relates to a packaging machine for the production of individual packagings having a planar product carrier and product enclosed in a gas-tight manner with a top film, and a method for operating the packaging machine.

BACKGROUND OF THE INVENTION

In practice, tray sealing machines are used that are also referred to as tray sealers. Such packaging machines are primarily configured for sealing tray-like packaging base members. However, their use for sealing planar product carriers has proven problematic. Above all, it is technically particularly challenging to transport planar packaging base members, such as cardboard blanks (paperboards), precisely, to grip them for a process to be carried out thereon, for example, for a sealing, venting, ventilation and/or cutting operation, and/or to center them within a sealing station.

WO 2018/024382 A1 discloses a packaging machine with workstations arranged successively in the direction of production for the manufacture of individual packagings with a planar product carrier and a product enclosed thereon by a top film in a gas-tight manner. Viewed in the direction of production, the packaging machine has a product carrier ejection station, a product delivery station, a sealing station for carrying out a sealing operation and a collection station for finished packagings. Positioned outside the sealing station is a cutting unit for a cutting operation, along which the top film is passed for the production of a cover film.

The sealing station of WO 2018/024382 A1 comprises a tool upper part and a tool lower part. The tool upper part is configured as a height-adjustable sealing frame which is lowered for the sealing operation onto the tool lower part which is also frame-like but formed to be stationary. In the closed position of the sealing station, a conveyor belt section is clamped between the tool lower part and the tool upper part which has been moved downwardly. The conveyor belt section is part of a conveyor belt which extends horizontally at a specified level along all the above-mentioned workstations and is passed along them in dependence of the method steps taking place thereon.

The drawback of the packaging machine described above is that only special packaging formats can be produced thereon. This is due in particular to the fact that the frame-like tool upper part and the complementary tool lower part determine the packaging geometry at the sealing station. A changeover process with regard to other packaging formats is therefore very complex, neither practical nor economically feasible.

What is added in WO 2018/024382 A1 is that the conveyor belt, the tool lower part as well as the product carrier itself are specially formed for a ventilation process, for which reason the field of application of the packaging machine furthermore serves only one specific application.

DE 10 2012 001 817 A1 discloses a packaging machine configured as a tray sealing machine. The tray sealing machine is equipped with a sealing station which comprises a tool upper part with a sealing tool mounted therein in a movable manner. Arranged below the tool upper part is a sealing clamping frame as a seat for a sealing operation, at which packaging trays are held available in a clamped manner for the sealing operation. For the sealing operation, the packaging trays are handed over to the sealing clamping frame by way of a conveyor belt positioned below the clamping frame. After the hand-over, the conveyor belt is lowered from its original transport position for the subsequent sealing operation, thereby moving away from the packaging trays. During the sealing operation, the sealing press forces are exerted upon the sealing clamping frame which is formed as a seal abutment. No sealing press forces are transferred to the lowered conveyor belt which is isolated from the sealing operation. This machine is ideally suited for transporting, gripping and sealing tray-like packaging base members. However, it is not an option for further processing planar cardboard blanks.

SUMMARY OF THE INVENTION

The object of the invention is to provide a packaging machine as well as a method for its operation, with which different packaging formats with a planar product carrier can be produced in a simple manner. In this respect, the packaging machine according to the invention is to comprise a high degree of standardized assemblies for cost reasons and be adaptable to different packaging formats, in particular, for reasons of a low changeover effort.

The invention relates to a packaging machine for the production of individual packagings, each with an, in particular, planar product carrier, for example, a cardboard blank, as well as a top film which encloses a product in a gas-tight manner disposed on the product carrier. The packaging machine according to the invention comprises a sealing station with a tool upper part that comprises an outer frame as well as at least one sealing tool mounted movable therein for a sealing operation, and with a tool lower part that comprises a belt conveying module with at least one conveyor belt mounted thereon. In a closed position of the sealing station, the tool upper part and the tool lower part are moved towards each other in such a way that they form a sealing chamber, in particular the outer frame formed on the tool upper part together with the belt conveying module.

According to the invention, in the closed position of the sealing station, the sealing tool mounted in the sealing chamber can be lowered for the sealing operation from a resting position, in which it may be mounted spaced from the conveyor belt, to a sealing position which may be moved closer to the conveyor belt, in which the conveyor belt absorbs at least in sections a sealing force exerted by the sealing tool as a counter-pressure support.

In other words, the belt conveyor module may be used in the invention during the sealing operation as a counter-pressure support for the sealing tool that may be lowered from the resting position to the sealing position. In addition to its actual transport function, the belt conveying module therefore additionally assumes the function of the sealing tool lower part. For this dual function, the belt conveying module may be mounted preferably on a machine frame of the packaging machine or separately in such a way that it absorbs all the sealing press forces exerted by the sealing tool.

The invention provides the advantage that the belt conveying module can be employed universally as a transport device as well as in the role of the sealing tool lower part for the production of different packaging formats, in particular in a single lane or in multiple lanes in the direction of transport and/or in a single row or in multiple rows transverse to the direction of transport. The sealing tool mounted movable at the tool upper part in the outer frame can be advantageously used as an exchange unit, i.e. be exchanged for or supplemented by another one without a great changeover effort. Consequently, the packaging machine according to the invention exhibits a high degree of standardization with respect to the functional units employed thereon, which in the interest of the user ultimately contributes to the fact that changeover work can be convenient and above all done in a cost-effective manner. The packaging machine according to the invention may be therefore predestined, in particular, for the production of different planar packaging formats.

The belt conveying module employed in the invention can have an overall compact configuration, especially together with the tool upper part, so that the overall structure of the packaging machine can be produced to be smaller than conventional machines. This also creates a potential for a more energy-conscious operation of the packaging machine.

The packaging machine according to the invention may be excellently suited for hygienic operation, where in particular the belt conveying module can be cleaned easily. In addition, the conveyor belt mounted on the belt conveying module can advantageously be replaced in a cost-effective manner as a wear and tear element.

The belt conveying module with the sealing station open can preferably be raised from a transport position, in which the respective product carriers loaded with products can be fed from outside the sealing station to the conveyor belt provided thereon, in the direction of the outer frame arranged thereabove in order to form the sealing chamber. The belt conveying module may be mounted there in a sealing position in which it may be employed as a sealing tool lower part for the sealing operation. In this position, the product carriers positioned on the belt conveying module are moved to a height level at which the sealing operation may be carried out on them. The height-adjustable mounting of the belt conveying module can be realized technically much easier than alternatively configured height-adjustable mounting of the tool upper part of the sealing station, especially if a top film transport unit may be attached thereto.

According to one embodiment, the tool lower part comprises a lifting mechanism with which the belt conveying module can be raised. From a technical perspective, the tool lower part may be therefore present as a multifunctional transfer device which may be configured for horizontal transport, i.e. in the direction of production, as well as for vertical transport, i.e. in the direction of lifting, of the product carriers lying thereon. The belt conveying module may be therefore configured for different transport motions aligned orthogonally to each other of the product carriers positioned thereon, which makes it possible to dispense with further transfer units, for example, with a separate product gripper. For height adjustment of the belt conveying module, the lifting mechanism can comprise a servo motor which may be preferably controllable based on process data, for example, with regard to sensor data detected at and/or upstream of the sealing station.

It may be advantageous for the sealing tool and the belt conveying module to be lowered together to a cutting position for performing a cutting operation. The sealing tool and the belt conveying module then form a functional unit, the synchronized height adjustment of which causes the top film to be severed.

For a compact design, one variant of the invention provides that the sealing tool comprise at least one cutting blade. This allows a cutting operation to be carried out within the sealing station. The cutting blade may be preferably attached to the sealing tool directly on the circumferential side. The cutting blade can preferably be heated by way of the sealing tool. This allows the cutting blade to thermally cut the top film. The sealing tool then fulfils a sealing as well as a cutting function, is quasi designed as a multifunctional tool. The cutting blade preferably comprises a cutting edge which may be arranged circumferentially along a sealing surface formed on the sealing tool. For an improved cutting operation, the cutting edge can have a slight projection beyond the sealing surface.

The tool upper part for securing the top film preferably comprises a clamping frame which in the closed position of the sealing station may be arranged between the outer frame and the belt conveying module for the formation of the sealing chamber. The clamping frame may be preferably formed as a functional component of the tool upper part. The clamping frame can in particular be joined with the outer frame arranged thereabove in such a way that the top film may be clamped therebetween. The outer frame then acts together with the clamping frame as a gripper unit, allowing the top film being passed through the sealing station to be secured for the work processes taking place therein.

It may be advantageous if the clamping frame can be raised from an initial position, in which it may be positioned at a predetermined height above the belt conveying module when the sealing station may be open, to the outer frame of the tool upper part positioned thereabove, in order to clamp the top film therebetween. A drive unit intended for this purpose can be provided at the tool lower part or at the tool upper part.

One variant provides that at least one ventilation and/or venting duct, with which a desired packaging atmosphere can be created, may be formed by way of the outer frame and the clamping frame at least in sections when the sealing station may be in the closed position. By providing this function by way of the tool upper part of the sealing station, the belt conveying module formed as a tool lower part, in particular the conveyor belt guided thereon, can be formed technically in a simple manner. According to one embodiment, at least one sealing strip may be arranged on the clamping frame and may be inserted into a recess of the outer frame, when the ventilation and/or venting duct may be formed as the sealing station is in the closed position. The sealing strip produced to be rubberized at least in part provides a reliable sealing function to the environment of the sealing station and additionally causes that the clamping frame can be joined in a gentle i.e. damped manner, and in particular silently, with the outer frame arranged thereabove. For these purposes, the sealing strip can be formed integrally or as an independent component on the clamping frame. In technical reversal, the sealing strip could alternatively also be formed on the outer frame and the recess on the clamping frame.

For the purpose of application according to the invention, it may be advantageous to have the belt conveying module comprise a heat-resistant conveyor belt which preferably has at least one woven belt material in the core. A conveyor belt which at least in part includes a metallic structure would be particularly clever, for example, in the form of a grid structure, so that, for example, it can be maintained at a desired temperature level by way of an induction heating provided at the tool lower part of the sealing station for improved sealing function when forming the sealing chamber.

Provided on the belt conveying module, may be preferably at least one support unit for the clamping frame on which the clamping frame rests at least temporarily in a predetermined position during a working cycle of the packaging machine. The support unit may be used as a seat for the clamping frame which may be functionally attached to the tool upper part, which overall leads to a very stable structure. This makes it possible, in particular, to produce the clamping frame in lightweight configuration.

One embodiment of the invention provides that the packaging machine comprises a top film transport unit and/or at least one separately actuatable feeding belt which may be positioned in the direction of transport upstream of the belt conveying module of the sealing station. By use of the top film transport unit, the top film employed for the manufacturing process can be fed precisely in position to the sealing station on the input side and be removed on the output side as a residual grid structure or vice versa. A robust structure can be provided, in particular, if the top film transport unit may be rigidly attached to the tool upper part of the sealing station.

One advantageous variant provides that the conveyor belt comprises at least one guide for the product carriers and/or one conveyor belt section of the belt conveying module facing the sealing tool arranged at least in part on a sliding plate formed as an abutment for the sealing operation on the belt conveying module. This allows the product carriers, firstly, to be fed to the sealing station precisely and, secondly, to be held stable in a desired position during the sealing operation, even if weighty products are placed thereon.

The sealing tool and the belt conveying module are preferably configured to seal packagings in the working direction of the packaging machine in multiple lanes and/or transverse to the working direction in multiple rows. The belt conveying module may be ideal for providing planar product carriers in a predetermined matrix for the sealing operation. According to a product carrier matrix provided from the belt conveying module, the sealing tool can be formed as a sealing plate with several sealing cavities. This achieves a high throughput rate of manufactured packagings.

The belt conveying module may be preferably equipped with at least one scraper which may be configured to clear impurities off the conveyor belt running by hygienically improved operation, in particular in the region of a lower conveyor belt section formed thereon.

The invention also relates to a method for the operation of a packaging machine for the production of individual packagings, each with an in particular planar product carrier as well as a top film which encloses a product in a gas-tight manner disposed on the product carrier. From a procedural perspective, a sealing station may be first adjusted to a closed position for a sealing operation in which a tool lower part and a tool upper part of the sealing station are moved towards each other in such a way that, in particular, an outer frame of the tool upper part and a belt conveying module of the tool lower part form a sealing chamber in essential parts.

According to the invention, at least one sealing tool mounted in the sealing chamber movable on the tool upper part for the sealing operation may be in the closed position of the sealing station lowered from a resting position, in which it may be mounted spaced from a conveyor belt of the belt conveying module, to a sealing position that may be moved closer to the conveyor belt, in which the conveyor belt absorbs at least in sections a sealing force exerted by the sealing tool as a counter-pressure support.

The belt conveying module employed in the method according to the invention as a sealing tool lower part overall forms a multifunctional lower part of the sealing station, because it may be technically used for transporting, forming the sealing chamber, and also as a counter-pressure support for the sealing operation.

It may be advantageous to have the belt conveying module be provided in a transport position when the sealing station is open in which the respective product carriers loaded with products are fed from outside the sealing station to the conveyor belt provided thereon, and to then move the belt conveying module in the direction of the outer frame arranged thereabove to form the sealing chamber. The belt conveying module may be therefore configured for different transport motions aligned orthogonally to each other of the product carriers positioned thereon, which makes it possible to dispense with further transfer units, for example, with a separate product gripper.

In order to achieve particularly economical operation on the packaging machine, packagings are sealed on the packaging machine by the sealing tool during the sealing operation in the working direction of the packaging machine in multiple lanes or transverse to the working direction of the packaging machine in multiple rows in every machine cycle of the belt conveying module.

One variant provides that the sealing tool and the belt conveying module together, i.e. as a functionally coupled unit, are lowered to a cutting position after the sealing operation in order to perform a cutting operation on the top film. The sealing tool as well as the belt conveying module on which the sealing tool rests can be lowered and synchronized to each other for the cutting operation. The top film clamped in the sealing chamber may be thus tensioned and severed somewhat inwardly along a circumference of the product carrier, in particular with respect to the latter's edge region, i.e. on the product carrier, so that the cut of the top film may be performed as a so-called inside cut.

According to one embodiment, at least one ventilation and/or venting duct, with which a desired packaging atmosphere can be created in the manufactured packagings, may be formed in the closed position of the sealing station at least in sections by way of the outer frame and the clamping frame movable theretowards and formed for clamping the top film. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention may be defined by the appended claims and the description may be, therefore, not to be taken in a limiting sense and shall not limit the scope of equivalents to which such claims are entitled.

Figure 1A:
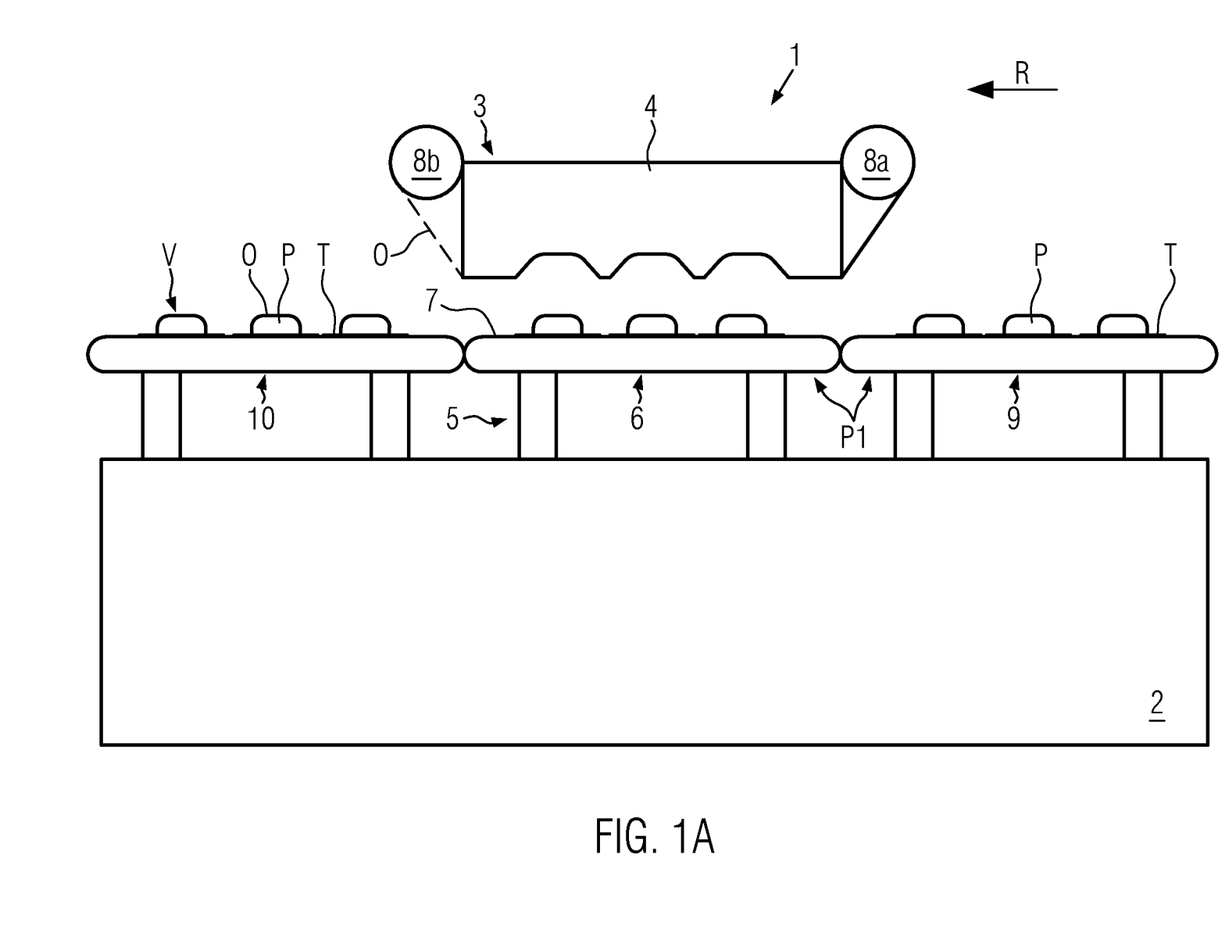
FIG. 1A is a schematic side view of one embodiment of a packaging machine in accordance with the teachings of the present disclosure.

FIG. 1A shows a packaging machine 1 for the production of individual packagings V each with an, in particular, planar product carrier T which is present, in particular, in the form of a cardboard blank, as well as a top film O which encloses in a gas-tight manner at least one product P, such as a food product, positioned on product carrier T.

Packaging machine 1 comprises a machine frame 2 on which a sealing station 3 is mounted. Sealing station 3 comprises a tool upper part 4 and a tool lower part 5. Tool lower part 5 is formed as a height-adjustable belt conveying module 6 which in the direction of transport R comprises at least one conveyor belt 7.

According to FIG. 1A, packaging machine 1 further comprises a top film transport unit 8a, 8b which is attached to tool upper part 4 on the inlet as well as outlet side. Top film transport unit 8a, 8b is configured to transport top film O through sealing station 3. In FIG. 1A, top film transport unit 8a, 8b is secured to tool upper part 4 such that the former maintains a fixed position on packaging machine 1 during operation.

A separately actuatable feeding belt 9 is mounted in the direction of transport R upstream of belt conveying module 6 of sealing station 3. Feeding belt 9 is configured to supply sealing station 3 continuously according to a machine cycle of packaging machine 1 with, in particular, grouped product carriers T having products P placed thereon. Positioned in the direction of transport R downstream of sealing station 3 is a removal belt 10 to which the finished packagings V can be handed over by belt conveying module 6 of sealing station 3 for further transport.

In FIG. 1A, feeding belt 9, disposed downstream belt conveying module 6, and removal belt 10 which in the direction of transport R is positioned downstream thereof each assume a transport position P1. In transport position P1, products P can be transported horizontally along the respective belt sections in the direction of transport R through packaging machine 1.

Figure 1B:
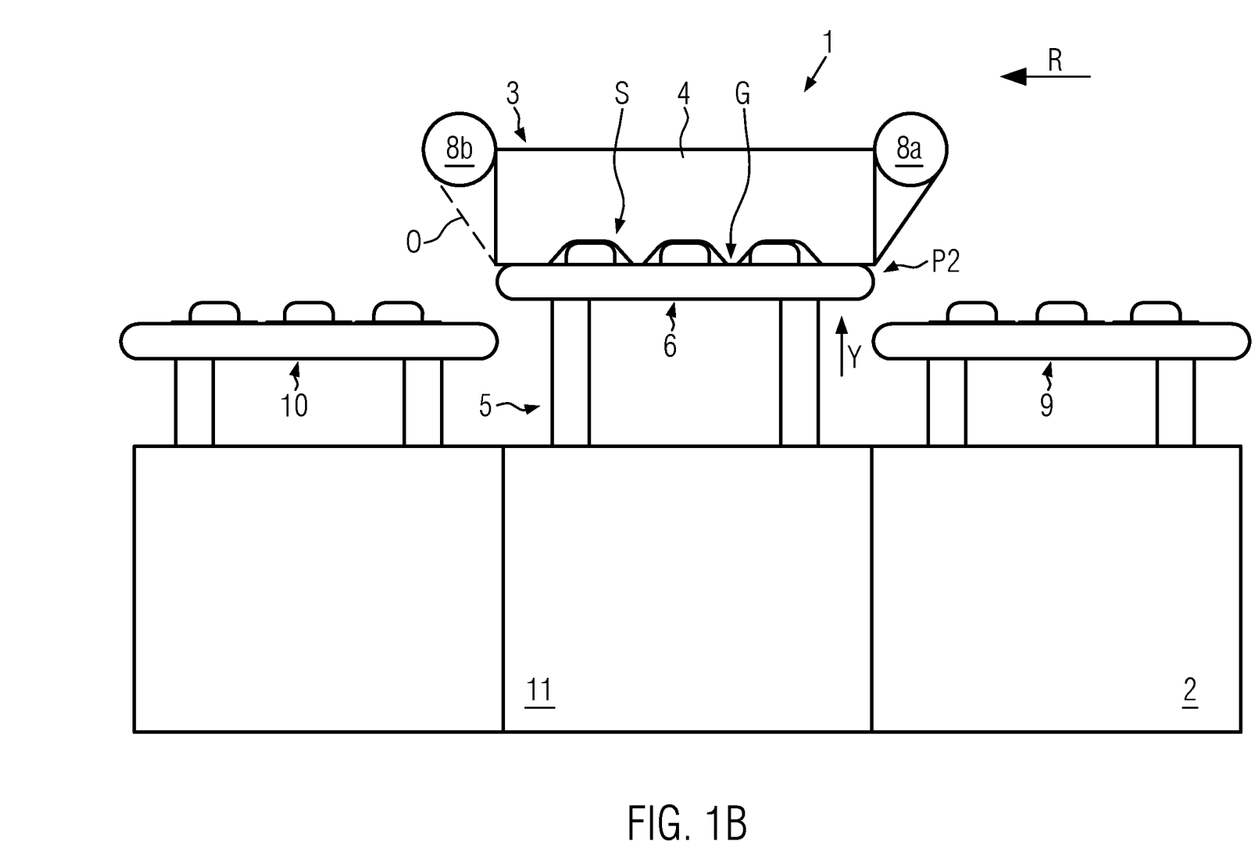
FIG. 1B is a schematic side view of the packaging machine from FIG. 1A in a second operating state.

FIG. 1B shows packaging machine 1 in an operating situation in which belt conveying module 6 is raised from its transport position P1, in which conveyor belt 7 provided thereon can be fed with respective product carriers T loaded with products P from outside sealing station 3, in direction Y of tool upper part 4 arranged thereabove. Feeding belt 9 and removal belt 10 remain in transport position P1.

For height adjustment of belt conveying module 6, tool lower part 5 comprises a lifting mechanism 11 which according to FIG. 1B is mounted on machine frame 2 of packaging machine 1. In the raised position according to FIG. 1B, belt conveying module 6 assumes a sealing position P2 in which belt conveying module 6 is joined with tool upper part 4 of sealing station 3. According to this arrangement, sealing station 3 assumes a closed position S for performing a sealing operation G.

FIGS. 2A to 2D show work processes in a functional representation taking place at sealing station 3.

Figure 2A:
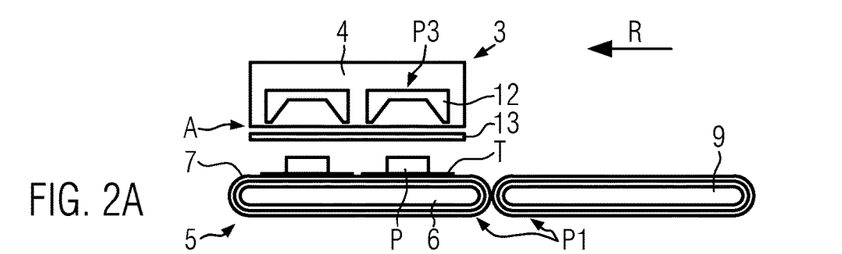
FIG. 2A is a schematic side view of one embodiment of an open sealing station of a packaging machine in accordance with the teachings of the present disclosure.

FIG. 2A shows sealing station 3 in an open position A. Feeding belt 9 and belt conveying module 6 are each mounted consecutively in direction of transport R in transport position P1.

FIG. 2A also shows that at least one sealing tool 12 is arranged in tool upper part 4. Sealing tool 12 is mounted movable inside tool upper part 4. FIG. 2A further shows a clamping frame 13 which is arranged above belt conveying module 6 and beneath sealing tool 12. Clamping frame 13 can be formed as a functional component of tool upper part 4 of sealing station 3 and is provided primarily for securing top film O within sealing station 3. FIG. 2A shows sealing tool 12 positioned in tool upper part 4 in a resting position P3 in which it assumes a raised position moved into tool upper part 4.

Figure 2B:
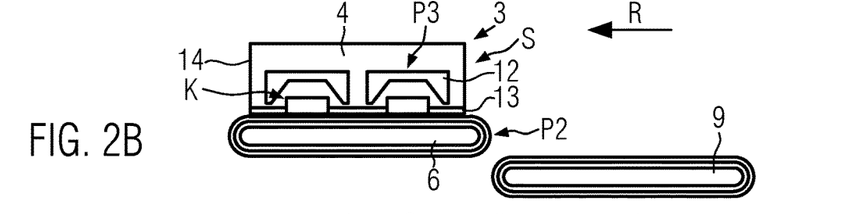
FIG. 2B is a schematic side view of the embodiment of FIG. 2A showing a closed representation of the sealing station for forming a sealing chamber.

FIG. 2B shows sealing station 3 in closed position S. Belt conveying module 6 is now disposed in raised sealing position P2 (see FIG. 1B). Belt conveying module 6, clamping frame 13 as well as an outer frame 14 formed on tool upper part 4 in closed position S form a closed sealing chamber K. According to FIG. 2B, sealing tool 12 is disposed inside sealing chamber K still in its raised resting position P3 spaced from conveyor belt 7.

Figure 2C:
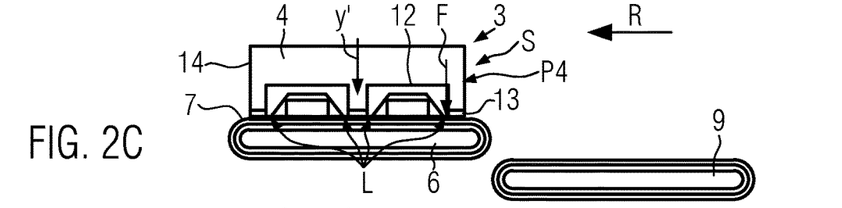
FIG. 2C is a schematic side view of the embodiment of FIG. 2A showing the closed sealing station with a sealing operation taking place therein.

FIG. 2C shows a sealing operation G. Sealing station 3 continues to be arranged in closed position S. However, sealing tool 12 mounted on tool upper part 4 within sealing chamber K is now for sealing operation G mounted lowered from resting position P3 shown in FIG. 2B to a sealing position P4, which is moved closer to conveyor belt 7 of belt conveying module 6, in which conveyor belt 7 absorbs at least in sections a sealing force F exerted by sealing tool 12 as a counter-pressure support L. For sealing operation G, sealing tool 12 is moved downwardly within sealing chamber K along an adjustment direction Y'.

Figure 2D:
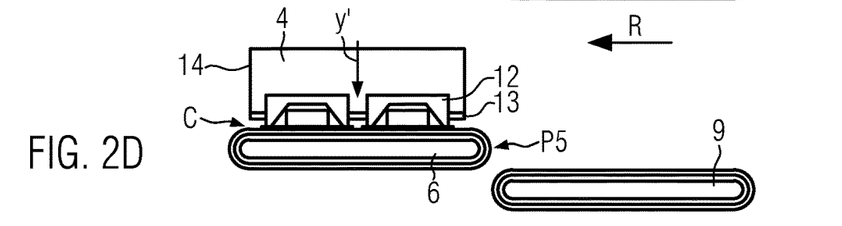
FIG. 2D is a schematic side view of the embodiment of FIG. 2A showing the sealing station in a position for performing a cutting operation of a top film secured therein.

FIG. 2D shows a cutting operation C. Sealing tool 12 and belt conveying module 6 are lowered together, i.e. synchronized relative to each other, for performing cutting operation C in a cutting position P5. In this adjustment motion coupled to each other, sealing tool 12 and belt conveying module 6 form a functional assembly which moves along adjustment direction Y' from outer frame 14 of tool upper part 4 of sealing station 3 downwardly. On the other hand, clamping frame 13 and outer frame 14 remain positioned as a gripper unit for top film O in the position assumed for forming sealing chamber K, so that top film O held tensioned therebetween is severed by way of a cutting blade 15 shown in FIG. 3 by way of a downwardly directed downward motion of sealing tool 12 together with belt conveying module 6.

Figure 3:
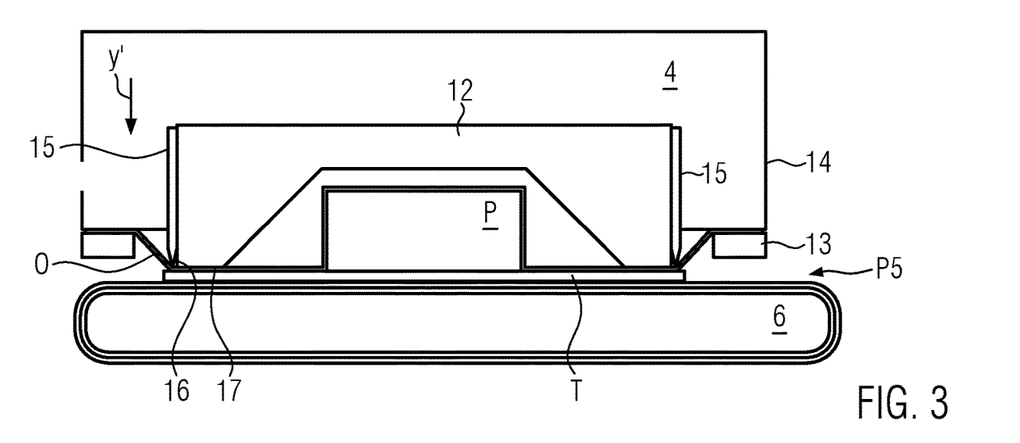
FIG. 3 shows an enlarged representation of a portion of the sealing station of FIG. 2D for illustrating the cutting operation performed therein.

FIG. 3 shows an enlarged illustration of cutting operation C according to FIG. 2D. In FIG. 3, sealing tool 12 and belt conveying module 6 positioned therebeneath are each disposed in cutting position P5 for severing top film O. By lowering sealing tool 12 together with belt conveying module 6 along adjustment direction Y' to cutting position P5, top film O clamped between outer frame 14 mounted in a stationary manner and clamping frame 13 abutting thereagainst can be completely severed with cutting blade 15.

FIG. 3 shows that cutting blade 15 is attached to sealing tool 12. Cutting blade 15 comprises a cutting edge 16 which is formed around a sealing surface 17 formed circumferentially around sealing tool 12 and which comprises a slight projection beyond a level of sealing surface 17 in the direction of belt conveying module 6 positioned therebeneath. This enables a particularly clean cut of top film O directly on product carrier T.

FIGS. 4A to 4G show further details according to the embodiment of sealing station 3 for the production of packagings V. Sealing station 3 is shown in a sectional view in direction of transport R.

Figure 4A:
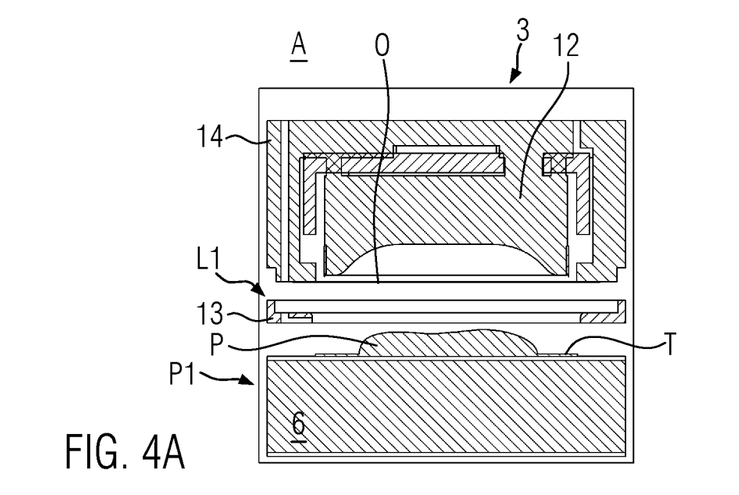
FIG. 4A is a schematic side view of one embodiment of a packaging machine in accordance with the teachings of the present disclosure which shows one of the method steps for the operation of a sealing station.

FIG. 4A shows sealing station 3 in open position A. In open position A, belt conveying module 6 is disposed in transport position P1. Clamping frame 13 positioned thereabove is mounted in a first position L1 between belt conveying module 6 and outer frame 14 of tool upper part 4 arranged thereabove. Top film O is provided between outer frame 14 and clamping frame 13 positioned therebeneath. A product carrier T with a product P placed thereon is positioned on belt conveying module 6.

Figure 4B:
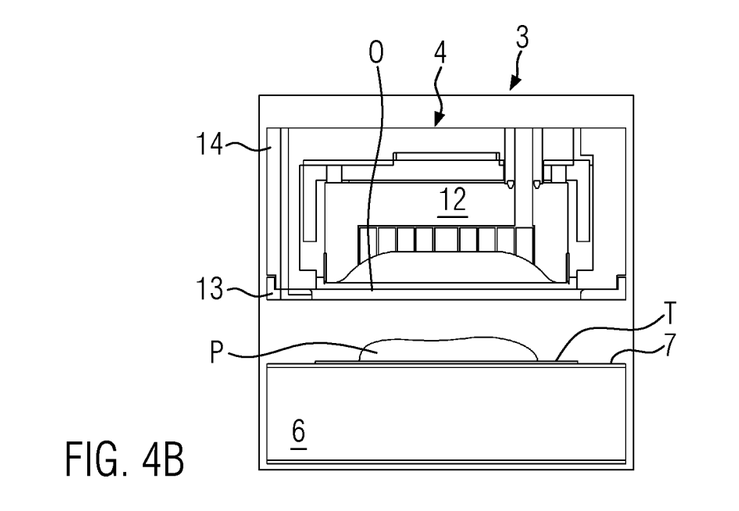
FIG. 4B is a schematic side view of the embodiment of the packaging machine shown in FIG. 4A which shows another one of the method steps for the operation of a sealing station; show a more detailed illustration of the method steps for the operation of the sealing station of a packaging machine according to the invention.

FIG. 4B shows clamping frame 13 in a second position L2 in which it is raised in comparison to first position L1 and bearing against outer frame 14 of tool upper part 4 of sealing station 3. In second position L2, top film O is clamped between clamping frame 13 and outer frame 14 positioned thereabove. In FIG. 4B, belt conveying module 6 continues to be mounted in transport position P1.

Figure 4C:
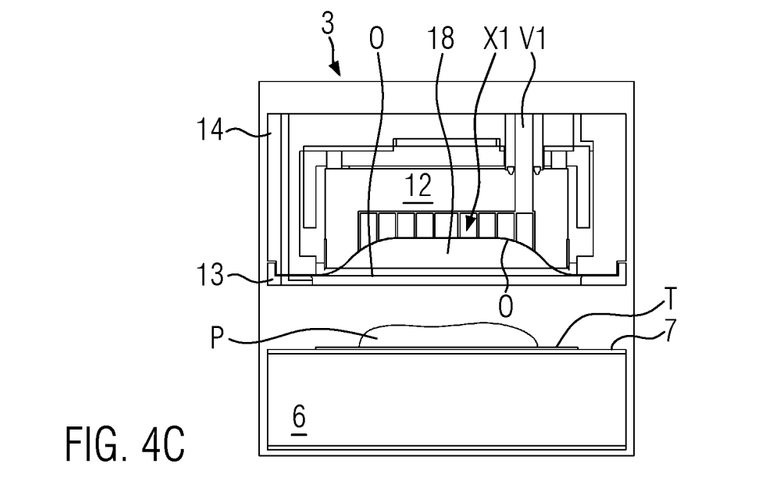
FIG. 4C is a schematic side view of the embodiment of the packaging machine shown in FIG. 4A which shows another one of the method steps for the operation of a sealing station.

FIG. 4C shows a first forming process X1 on top film O. In this process, top film O clamped between clamping frame 13 and outer frame 14 is drawn by way of a vacuum V1 applied to sealing tool 12 into a cavity formed at sealing tool 12. Cavity 18 is formed in terms of a geometry of product P. This forming process causes that subsequent methods steps can be performed better.

Figure 4D:
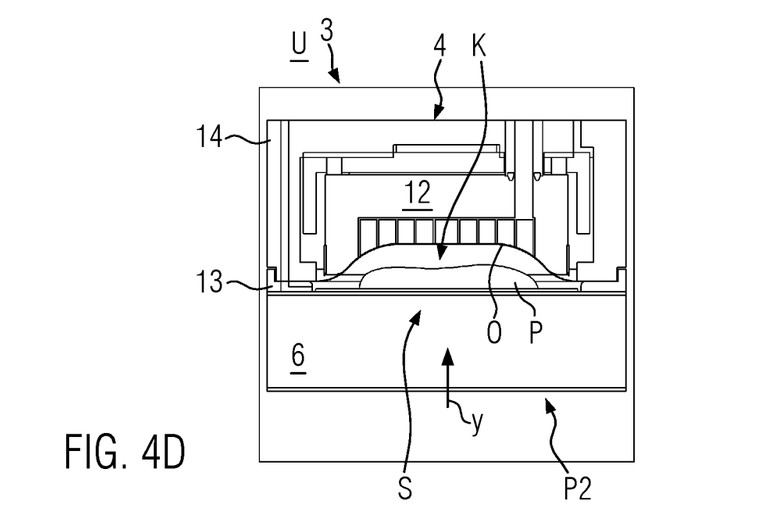
FIG. 4D is a schematic side view of the embodiment of the packaging machine shown in FIG. 4A which shows another one of the method steps for the operation of a sealing station.

FIG. 4D shows sealing station 3 in closed position S. In closed position S, belt conveying module 6 is positioned from its transport position P1, in which conveyor belt 7 provided thereon can be supplied from outside sealing station 3 with respective product carriers T loaded with products P, upwardly offset to sealing position P2 in direction Y of outer frame 14 arranged thereabove for forming sealing chamber K. Sealing chamber K thus formed is formed to be hermetically sealed against environment U of sealing station 3.

Figure 4E:
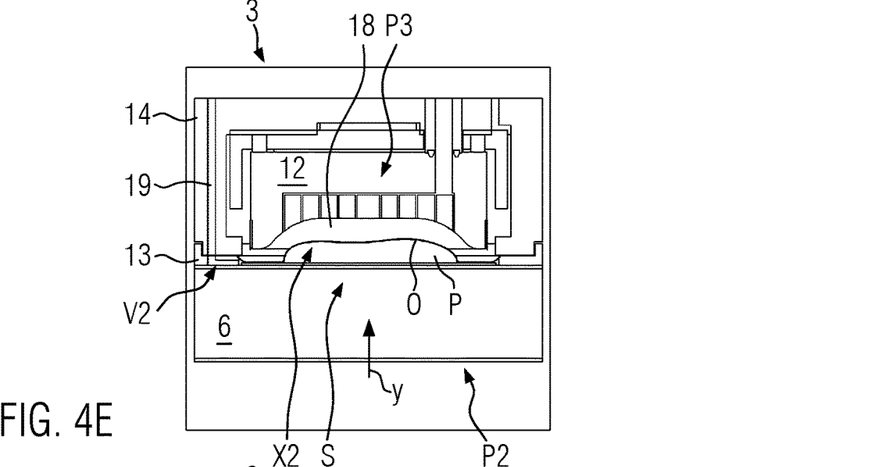
FIG. 4E is a schematic side view of the embodiment of the packaging machine shown in FIG. 4A which shows another one of the method steps for the operation of a sealing station.

FIG. 4E shows a second forming process X2 on top film O. Second forming process X2 is performed by use of a ventilation and/or venting duct 19 which in closed position S of sealing station 3 is formed by way of outer frame 14 and clamping frame 13. Ventilation and/or venting duct 19 establishes a connection to the interior of the packaging in order to create a desired packaging atmosphere therein. FIG. 4E shows that a product vacuum V2 is applied via ventilation and/or venting duct 19 with which top film O can be abruptly drawn downwardly from cavity K of sealing tool 12 toward product P. Vacuum V1 applied for first forming process X1 can be reduced in such a controlled manner that top film O can be approached to the surface of product P in a controlled manner. Top film O then rest against the surface of product P like a second skin, thereby producing a skin packaging.

It is to be mentioned at this point that a gas flushing process can be performed prior to second forming process X2 via ventilation and/or venting duct 19, by means of which product P is flushed with a gas that is suitable, in particular, for the extension of shelf life.

Figure 4F:
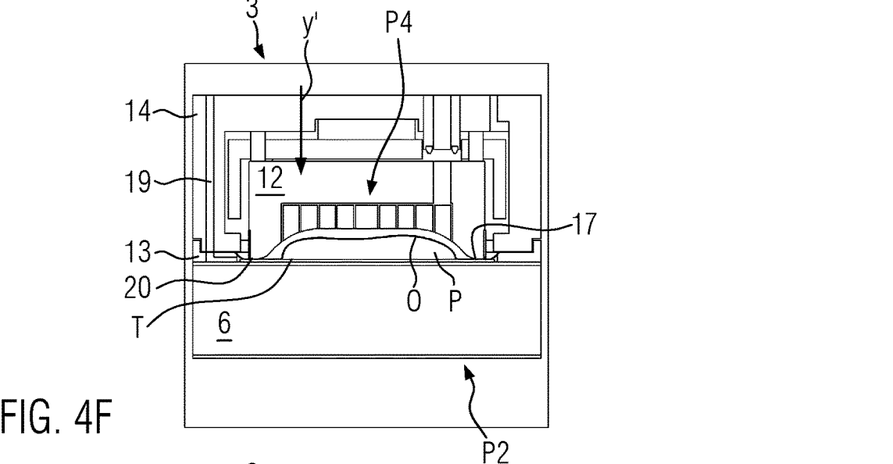
FIG. 4F is a schematic side view of the embodiment of the packaging machine shown in FIG. 4A which shows another one of the method steps for the operation of a sealing station.

In FIG. 4F, sealing station 3 is still in closed position S. However, sealing tool 12, which is positioned movable inside outer frame 14 on tool upper part 4, is now positioned from resting position P3 shown in preceding FIGS. 4A to 4E to sealing position P4. Sealing surface 17 formed on sealing tool 12 now presses top film O from above onto product carrier T to produce a hot seal seam 20 all around product carrier T.

Figure 4G:
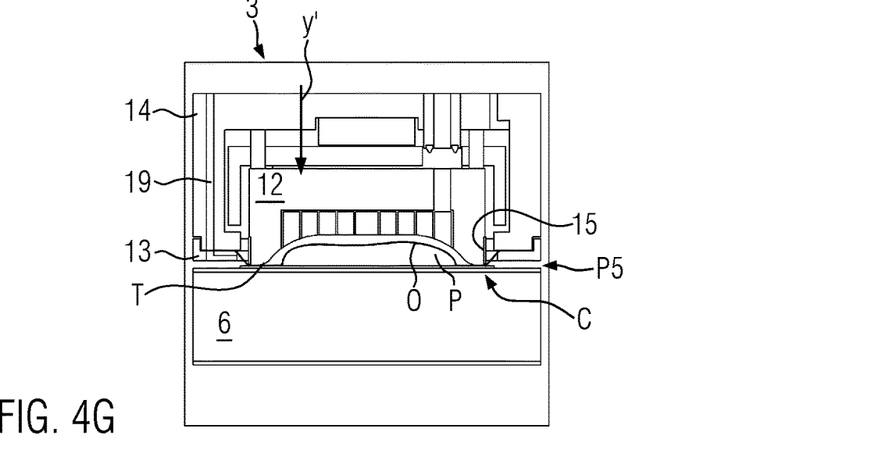
FIG. 4G is a schematic side view of the embodiment of the packaging machine shown in FIG. 4A which shows another one of the method steps for the operation of a sealing station.

FIG. 4G finally shows cutting operation C. Sealing tool 12 and belt conveying module 6 are there further lowered in a synchronized manner downwardly in adjustment direction Y' for severing top film O. Outer frame 14 as well as clamping frame 13 positioned thereon remain in the arrangement shown in FIGS. 4B to 4F, so that cutting operation C on top film O is accomplished by way of the downward motion of sealing tool 12 and belt conveying module 6. Top film O is there clamped against cutting blade 15 in such a way that a clean cut arises. This is achieved in particular by the fact that cutting blade 15 attached to sealing tool 12 can be heated by use of sealing tool 12, so that a thermal separation process is obtained.

FIG. 4G also shows that cutting blade 15 performs cutting operation C of top film O directly on product carrier T. After cutting operation C has been carried out, sealing station 3 opens and returns to open position A according to FIG. 4A in which finished packaging V is passed from belt conveyor 6 to downstream removal belt 10.

Figure 5:
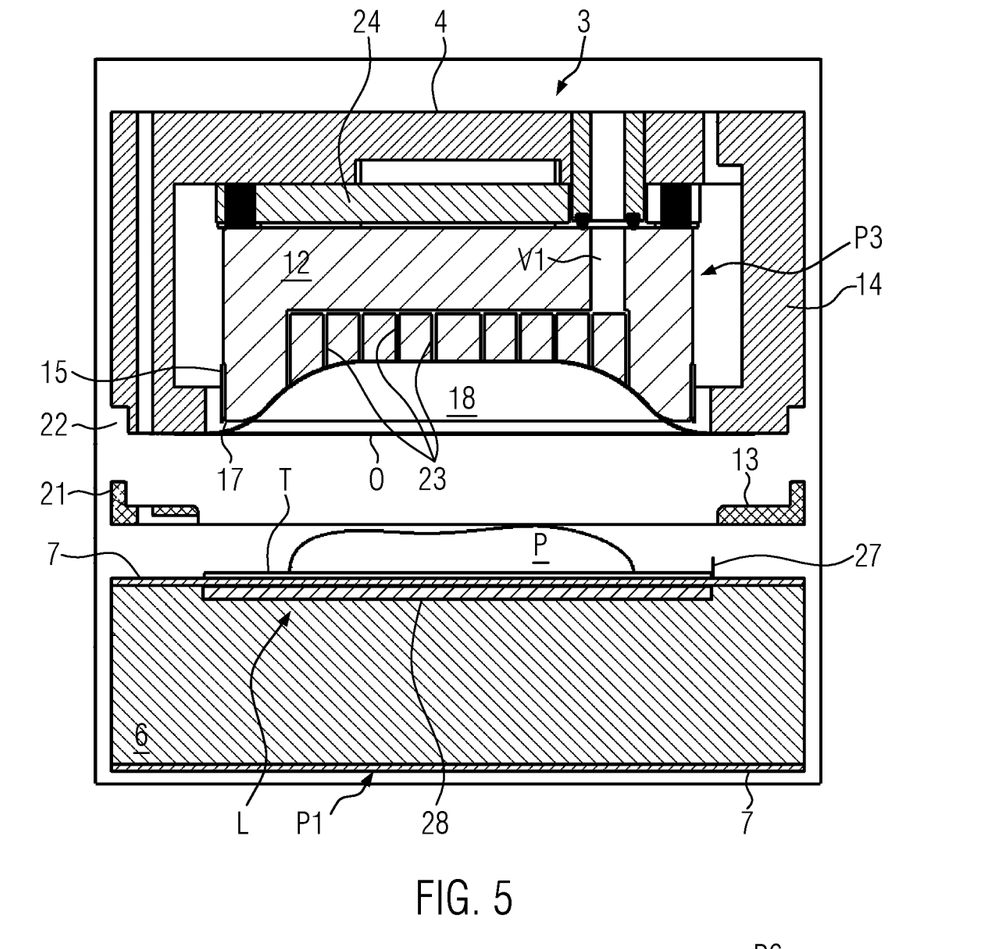
FIG. 5 is a schematic sectional side view of one embodiment the sealing station in accordance with the teachings of the present disclosure.

FIG. 5 shows sealing station 3 in a detailed illustration in is open position A. Belt conveying module 6 is positioned in transport position P1. Disposed on conveyor belt 7 of belt conveying module 6 is a product carrier T with a product P placed thereon. Clamping frame 13 is mounted above belt conveying module 6. Positioned further above clamping frame 13 is tool upper part 4 of t sealing station 3. According to FIG. 5, a sealing strip 21 is formed all around on clamping frame 13. Sealing strip 21 is configured in such a way that it is inserted into a recess 22 of outer frame 14 when sealing station 3 forms ventilation and/or venting duct 19 in closed position S.

FIG. 5 also shows that sealing tool 12 comprises multiple vacuum channels 23 for first forming process X1. Vacuum V1 can be applied via vacuum channels 23 and is adjustable for drawing top film O into cavity 18.

In addition, FIG. 5 shows an adjustment unit 24 which is configured to move sealing tool 12 positioned therebeneath from a resting position P3 shown in FIG. 5, in which sealing tool 12 is positioned in outer frame 14 of tool upper part 4 offset upwardly, to sealing position P4 (see e.g. FIG. 4F), in which sealing tool 12 hot seals top film O from above onto product carrier T. Adjustment unit 24 can be formed, for example, as an inflatable membrane. FIG. 5 also shows that stops 25 for sealing tool 12 are formed in tool upper part 4. Stops 25 act as a damper when sealing tool 12 is adjusted from sealing position P4 back to resting position P3.

According to FIG. 5, a guide 27 is formed on conveyor belt 7 along which product carriers T can be guided precisely in position through the packaging process. A sliding plate 28 is arranged according to FIG. 5 as counter-pressure support L on belt conveying module 6 directly below a section of conveyor belt 7. By way of sliding plate 28, belt conveying module 6 forms a sturdy seat for sealing tool 12 during sealing operation G.

Figure 6:
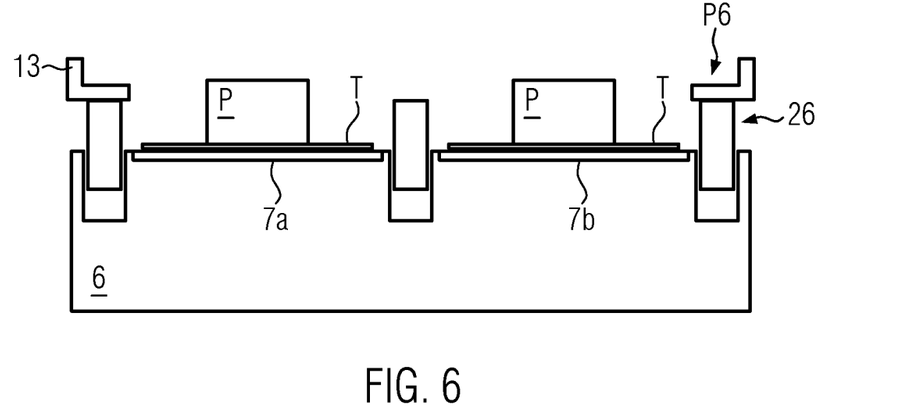
FIG. 6 is a schematic end view of one embodiment of a belt conveying module of a packaging machine in accordance with the teachings of the present disclosure showing a multiple-lane guide that, in one embodiment, can be used as a tool lower part of the sealing station.

FIG. 6 shows height-adjustable belt conveying module 6 in a two-lane version. In this variant, two conveyor belts 7*a*, 7*b* are arranged guided parallel at belt conveying module 6. FIG. 6 also shows that belt conveying module 6 is provided with a support unit 26. Support unit 26 is configured to support clamping frame 13 at least temporarily during the packaging process in the position shown in FIG. 5 such that it is rigid in shape during the packaging process. Support unit 26 can be configured to move clamping frame 13 to and fro on outer frame 14 arranged thereabove for clamping top film O. Support unit 26 enables, in particular, that clamping frame 13 itself can be formed as a lightweight structure.

The packaging machine according to the invention is excellently suited for the production of individual packagings V, each with an, in particular, planar product carrier T as well as a top film O which encloses in a gas-tight manner a product P positioned on product carrier T. The packaging machine according to the invention can be quickly changed over with regard to a varying product geometry. For this purpose, the unit of sealing tool 12 can be easily removed from tool upper part 4 and be replaced with a different specific sealing tool. furthermore, the packaging machine according to the invention has a high degree of standardized components, so that the packaging machine can be employed overall for the production of varying packaging formats. The present inventive concept favors in particular a standardized configuration of belt conveying module 6 which is used as a tool lower part 5 at sealing station 3 and which is employed for versatile transport as well as for the formation of the sealing chamber.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine for production of a plurality of individual packagings, each packaging having a planar product carrier, and a top film which encloses a product positioned on the product carrier in a gas-tight manner, the packaging machine comprising:

a sealing station with a tool upper part which comprises an outer frame as well as a sealing tool mounted movable relative to the outer frame and configured for a heated sealing operation of the planar product carrier and the top film, and with a tool lower part that comprises a belt conveying module including a conveyor belt;

wherein the sealing station has a closed position in which the outer frame together with the belt conveying module form a sealing chamber; and wherein in the closed position of the sealing station, the sealing tool mounted in the sealing chamber can be lowered for the heated sealing operation from a resting position, in which the sealing tool is mounted spaced from the conveyor belt, to a sealing position in which the sealing tool is moved closer to the conveyor belt, and wherein the conveyor belt is configured to absorb, at least in sections, all sealing press force exerted by the sealing tool as a counter-pressure support when the sealing tool is in the sealing position.

2. The packaging machine according to claim 1, wherein the belt conveying module with the sealing station open can be raised from a transport position in a direction of the outer frame arranged thereabove in order to form the sealing chamber, wherein the respective product carriers having products supported thereon are feedable from outside the sealing station to the conveyor belt.

3. The packaging machine according to claim 1, wherein the tool lower part comprises a lifting mechanism to raise the belt conveying module.

4. The packaging machine according to claim 1, wherein the sealing tool and the belt conveying module are disposed to be lowered together to a cutting position for performing a cutting operation.

5. The packaging machine according to claim 1, wherein the tool upper part comprises a clamping frame for securing the top film, and wherein when the tool upper part is in the closed position, the clamping frame is disposed between the outer frame and the belt conveying module for the formation of the sealing chamber.

6. The packaging machine according to claim 5, wherein at least one ventilation and/or venting duct is formed in the closed position by way of the outer frame and the clamping frame, wherein the at least one ventilation and/or venting duct may create a desired packaging atmosphere.

7. The packaging machine according to claim 5, further comprising at least one support unit for the clamping frame provided on the belt conveying module, and the clamping frame rests on the at least one support unit at least temporarily in a predetermined position during a working cycle of the packaging machine.

8. The packaging machine according to claim 1, further comprising a top film transport unit and/or at least one separately actuatable feeding belt which is positioned in a direction of transport upstream of the belt conveying module of the sealing station.

9. The packaging machine according to claim 1, wherein the conveyor belt comprises at least one guide for the product carriers and/or a conveyor belt section of the conveyor belt facing the sealing tool is arranged at least in part on a sliding plate of the conveyor belt formed as an abutment for the sealing operation.

10. The packaging machine according to claim 1, wherein the sealing tool and the belt conveying module are disposed to seal packagings according to a machine cycle in multiple lanes and/or in multiple rows.

11. The packaging machine according to claim 1, wherein the sealing tool is configured to produce a hot seal seam during the sealing operation.

12. A method for operating a packaging machine for production of individual packagings, the method comprising steps of:
adjusting a sealing station to a closed position for a sealing operation, wherein the sealing station comprises a tool upper part and a tool lower part, and, in the closed position of the sealing station, an outer frame of the tool upper part and a belt conveying module of the tool lower part form a sealing chamber;
lowering at least one heated sealing tool that is mounted in the sealing chamber toward the belt conveying module from a resting position to a sealing position for the sealing operation so that the at least one sealing tool is moved relative to the outer frame;
absorbing all sealing press force exerted by the at least one sealing tool on the belt conveying module, wherein the belt conveying module acts as a counter-pressure support; and
enclosing a product positioned on a product carrier with a top film in a gas-tight manner when the at least one sealing tool is in the sealing position.

13. The method according to claim 12, further comprising steps of:
providing the belt conveying module in a transport position when the sealing station is in an open position;
loading the belt conveying module with one or more of the product carriers, each of the one or more product carriers loaded with a product;
feeding the one or more of the product carriers loaded with products from outside the sealing station to the belt conveying module; and
moving the belt conveying module in the direction of the outer frame arranged above the belt conveying module in order to form the sealing chamber.

14. The method according to claim 12, further comprising a step of lowering the at least one sealing tool and the belt conveying module together to a cutting position for performing a cutting operation after the enclosing the product positioned on the product carrier step.

15. The method according to claim 12, further comprising steps of:
forming at least one ventilation duct and/or at least one venting duct into the sealing chamber when the sealing station is in the closed position using one or more of the outer frame or a clamping frame, wherein the clamping frame is movable and disposed for clamping the top film; and
creating a desired packaging atmosphere in the packagings using the at least one ventilation duct and/or the at least one venting duct.

16. The method according to claim 12, further comprising a step of sealing the packagings using the at least one sealing tool on the belt conveying module during the sealing operation in a working direction in multiple lanes and/or in multiple rows transverse to the working direction.

17. The method according to claim 12, wherein the sealing tool produces a seal seam for sealing the top film with the product carrier.

18. A packaging machine for production of an individual packaging having a product carrier and a top film that covers a product positioned on the product carrier, the packaging machine comprising:
a sealing station with a tool upper part, the tool upper part comprising an outer frame and at least one sealing tool that is movable between a resting position and a sealing position and configured for a heated sealing operation to seal the top film onto the product carrier; and
a tool lower part that comprises a belt conveying module having at least one conveyor belt;
wherein in a closed position of the sealing station, the tool upper part and the tool lower part are disposed such that the outer frame and the belt conveying module define a sealing chamber, wherein in the closed position of the sealing station, the at least one sealing tool is moveable within the sealing chamber and relative to the outer frame from the resting position to the sealing position for the heated sealing operation, and wherein at least a portion of the at least one conveyor belt is configured to absorb all sealing press force exerted by the at least one sealing tool as a counter-pressure support when the at least one sealing tool is in the sealing position.

19. The packaging machine according to claim 18, wherein the belt conveying module is movable toward the tool upper part to form the sealing chamber.

20. The packaging machine according to claim 18, further comprising a feeding belt positioned in a direction of transport upstream of the belt conveying module for feeding the product carrier to the belt conveying module, wherein the belt conveying module is movable toward the tool upper part and relative to the feeding belt to form the sealing chamber.

21. The packaging machine according to claim 18, wherein the tool upper part comprises a clamping frame that is movable with respect to the outer frame for securing the top film between the clamping frame and the outer frame, and wherein when the sealing station is in the closed position, the clamping frame is disposed between the outer frame and the belt conveying module to define the sealing chamber.

22. The packaging machine according to claim 18, wherein the at least one sealing tool and the belt conveying module are configured to be moved together, and relative to the outer frame, to a cutting position for performing a cutting operation on the top film, and wherein the sealing station further comprises a cutting blade attached to the at least one sealing tool for performing the cutting operation.

23. The packaging machine according to claim 18, wherein the sealing tool is configured to produce a seal seam to seal the top film to the product carrier.

\* \* \* \* \*